Sept. 14, 1948.  C. H. DICKMAN  2,449,282
MANUALLY OPERATED VEGETABLE SLICER
Filed June 22, 1945
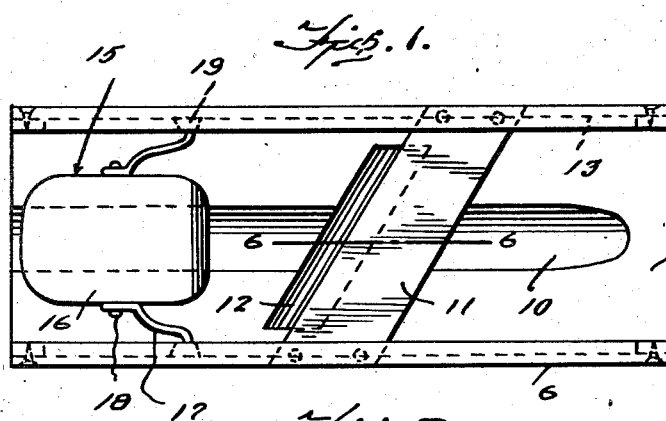
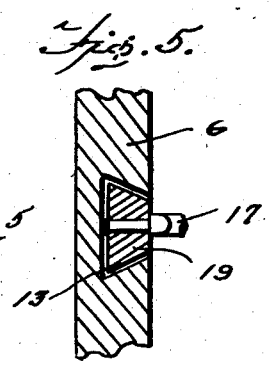
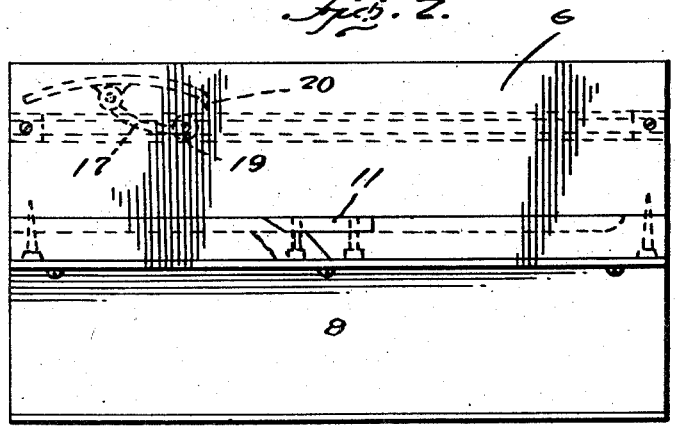
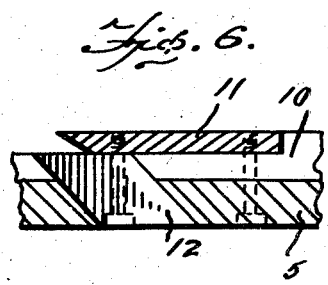
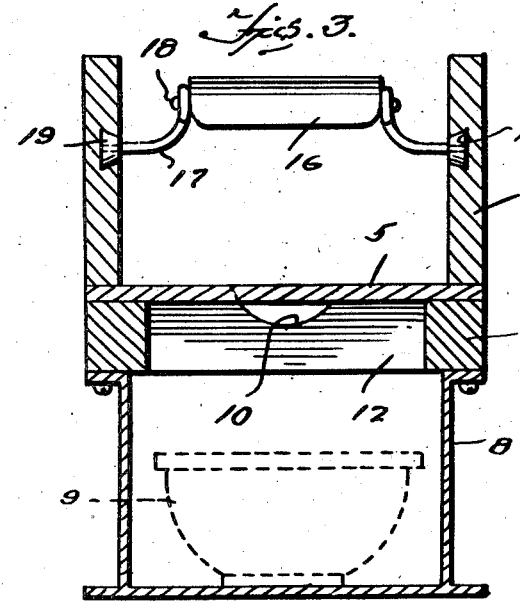
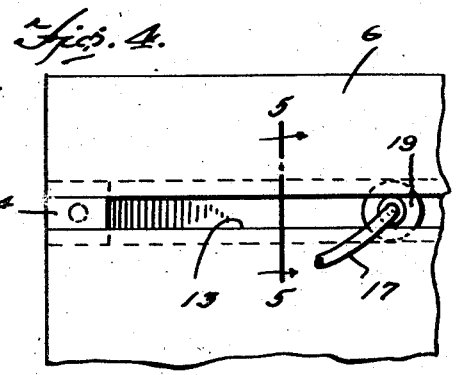
Inventor
Calvin H. Dickman Patented Sept. 14, 1948

2,449,282

UNITED STATES PATENT OFFICE 2,449,282

MANUALLY OPERATED VEGETABLE SLICER

Calvin H. Dickman, Brewster, Minn.

Application June 22, 1945, Serial No. 600,983

3 Claims. (Cl. 146—168)

The present invention relates to new and useful improvements in devices for preparing vegetables for cooking or canning, and more particularly to a device of this character adapted for slicing elongated vegetables, such as corn, carrots and the like.

An important object is to provide a device of this character of simple and practical construction, which is efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a top plan view.

Figure 2 is a side elevational view.

Figure 3 is a transverse sectional view.

Figure 4 is an enlarged fragmentary view in elevation of the inner side of one of the side walls of the device.

Figure 5 is a fragmentary sectional view taken substantially on a line 5—5 of Figure 4.

Figure 6 is a transverse sectional view of the cutter taken substantially on a line 6—6 of Figure 1.

Referring now to the drawing in detail, wherein for the purpose of illustration I have disclosed a preferred embodiment of the invention, the numeral 5 designates the bottom of the slicer having spaced parallel upstanding walls 6 at the side edges thereof, the bottom 5 being secured to flanges 7 formed on the upper edge of a channel-shaped base 8, open at each end and adapted to receive a dish or other receptacle 9 therein.

The upper surface of the bottom 5 is formed with a longitudinally extending trough 10 extending outwardly at one end of the bottom and terminating short of the opposite end thereof, as shown to advantage in Figure 1 of the drawing.

A cutter 11 is secured in a transversely inclined position above the trough 10 and an opening 12 is formed in the bottom of the trough immediately below the front edge of the cutter 11 and through which vegetables coming into contact with the cutter may be discharged into the dish or receptacle 9.

The inner surfaces of the side walls are formed with longitudinally extending dovetail grooves 13, the ends of the grooves being closed by stops 14.

A carriage designated generally at 15 comprises an arcuate plate 16 and is rockably mounted on one end of a pair of resilient arms 17 by means of pins 18 at the side edges of the plate, the arms extending outwardly and provided with rollers 19 journaled at the outer ends of the arms and adapted to travel in the grooves 13.

The arms 17 extend outwardly and forwardly so that the rollers 19 are positioned adjacent the front edge of the plate 16 and the front edge of the plate is formed with a downwardly projecting sharpened edge 20 adapted to bite in the upper surface of vegetables placed in the trough 10.

Accordingly, in the operation of the device, an elongated vegetable, such as a carrot, ear of corn, or the like, is placed in the trough 10 and pressure is exerted on the plate 16 by the hand of a person so as to cause the sharpened edge 20 thereof to bite into the vegetable, whereby the vegetable may be slidably actuated in the trough 10 by a forward and backward motion exerted on the plate 16 by the palm of the hand of a person.

As the vegetable moves into engagement with the edge of the cutter 11, the vegetable will be sliced, and discharged through the opening 12 into the dish or receptacle 9.

It is believed the details of construction, manner of operation and advantages of the device will be readily understood from the foregoing without further detailed explanation.

While I have disclosed a preferred embodiment of the invention, it will be apparent that various changes in construction may be resorted to without departing from the spirit of the invention or the scope of the appended claims.

Having thus described the invention, what I claim is:

1. A vegetable slicer, comprising a base having an opening formed therein, upstanding sides secured to the base and including longitudinal guide means, a stationary cutter disposed adjacent to the opening and between said upstanding sides, arms pivotally mounted upon the upstanding sides and including parts engaging said longitudinal guide means and movable along the same, and a manually operable plate disposed above the base and pivotally connected to the arms, the arrangement being such that the plate is rockable longitudinally and movable vertically and longitudinally with respect to the base.

2. A vegetable slicer, comprising a base provided with an opening, upstanding sides secured to the base and having longitudinal guide grooves in their inner faces, stationary cutter adjacent to the opening and extending transversely between said upstanding sides, lateral arms pivotally mounted upon the upstanding sides and including rollers to engage in the guide grooves, and a manually operable plate having a forward sharpened edge and arranged above the base and pivotally connected to the arms, the plate being rockable longitudinally and movable vertically and longitudinally with respect to the base.

3. A vegetable slicer, comprising a base having a longitudinal trough formed in its surface and provided with an opening, upstanding sides secured to the base and having longitudinal guide grooves in their opposed faces, a cutter mounted adjacent to the opening and disposed transversely of the base and between said upstanding sides, lateral arms pivotally mounted upon the upstanding sides and projecting inwardly therefrom, rollers mounted upon the outer ends of the arms and engaging in said guide grooves to move longitudinally therein, and a manually operable plate having a depending sharpened end edge and being disposed above the base and pivotally connected to the inner ends of the arms, the plate being rockable upon the arms and movable vertically and longitudinally with respect to said trough.

CALVIN H. DICKMAN.

REFERENCES CITED

The following references are of record in the file of this patent:

UNITED STATES PATENTS

| Number | Name | Date |
|---|---|---|
| 235,253 | Kanne | Dec. 7, 1880 |
| 1,522,002 | Elster | Jan. 6, 1925 |
| 1,825,421 | Roesch | Sept. 29, 1931 |
| 1,834,717 | Knapp | Dec. 1, 1931 |
| 2,120,164 | Streckfuss | June 7, 1938 |
| 2,282,660 | Lee | May 12, 1942 |
| 2,303,595 | Young | Dec. 1, 1942 |
| 2,342,213 | Ostrander | Feb. 22, 1944 |

FOREIGN PATENTS

| Number | Country | Date |
|---|---|---|
| 486,118 | Great Britain | May 26, 1938 |